(12) United States Patent
Liu et al.

(10) Patent No.: US 11,241,734 B2
(45) Date of Patent: Feb. 8, 2022

(54) DOUBLE-STATION CLEANING SYSTEM

(71) Applicant: CITIC Dicastal Co., LTD, Qinhuangdao (CN)

(72) Inventors: Hailong Liu, Qinhuangdao (CN); Haipeng Feng, Qinhuangdao (CN); Naili Li, Qinhuangdao (CN); Hongji Zhou, Qinhuangdao (CN); Jiansheng Wang, Qinhuangdao (CN); Zhen Ge, Qinhuangdao (CN); Zhi Chen, Qinhuangdao (CN); Fengbao Luo, Qinhuangdao (CN); Xin Fan, Qinhuangdao (CN); Yongyue Huang, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 293 days.

(21) Appl. No.: 16/663,347

(22) Filed: Oct. 25, 2019

(65) Prior Publication Data
US 2020/0298305 A1   Sep. 24, 2020

(30) Foreign Application Priority Data
Mar. 21, 2019   (CN) .......................... 201910216435.2

(51) Int. Cl.
| | |
|---|---|
| *B22D 31/00* | (2006.01) |
| *B65G 1/10* | (2006.01) |
| *B08B 13/00* | (2006.01) |
| *B65G 9/00* | (2006.01) |
| *B08B 1/02* | (2006.01) |
| *B08B 3/04* | (2006.01) |

(52) U.S. Cl.
CPC .............. *B22D 31/002* (2013.01); *B08B 1/02* (2013.01); *B08B 13/00* (2013.01); *B65G 1/10* (2013.01); *B65G 9/002* (2013.01); *B08B 3/041* (2013.01)

(58) Field of Classification Search
None
See application file for complete search history.

(56) References Cited

U.S. PATENT DOCUMENTS 9,586,242 B2 *   3/2017   Zardini ................... B08B 13/00

FOREIGN PATENT DOCUMENTS

| CN | 202412649 U | 9/2012 |
|---|---|---|
| DE | 202013009880 U1 | 1/2014 |

(Continued)

OTHER PUBLICATIONS

Extended European Search Report for the corresponding EP application No. 20154524.1, dated Aug. 10, 2020, 15 pages.

*Primary Examiner* — Michael E Barr
*Assistant Examiner* — Omair Chaudhri

(57) ABSTRACT

Provided is a double-station cleaning system comprising a cleaning machine, wherein workpieces are placed into the feeding frames, the feeding frames are placed into trays, the bracket assembly is pushed to drive the trays to move along the guide rail assembly, the feeding frame in one of the trays is conveyed to a feeding inlet of the cleaning machine, the feeding frame is pushed to move along two rows of nylon wheels and linear guide rails inside the cleaning machine, and the feeding frame and the workpieces in the feeding frame are pushed into the cleaning machine so as to be cleaned. The double stations work alternately, so that the work time is saved, and the work efficiency is increased.

10 Claims, 2 Drawing Sheets

(56) References Cited

FOREIGN PATENT DOCUMENTS

| EP | 2648769 B1 | 7/2014 | | |
|---|---|---|---|---|
| EP | 2962617 A1 | 1/2016 | | |
| EP | 2881062 B1 * | 3/2017 | ............. | A61B 90/70 |
| WO | 2013037709 A1 | 3/2013 | | |
| WO | WO-2013037709 A1 * | 3/2013 | ............. | B08B 15/00 |

* cited by examiner

DOUBLE-STATION CLEANING SYSTEM

CROSS-REFERENCE TO RELATED APPLICATIONS

The present application claims the priority of Chinese patent application No. 201910216435.2, filed on Mar. 21, 2019, which is hereby incorporated by reference in its entirety.

TECHNICAL FIELD

The application relates to the technical field of casting product cleaning and specifically relates to a double-station cleaning system.

BACKGROUND

After current some castings are processed and produced, oil stains are often attached to the outer surfaces of the castings and the surface of inner cavities, sundries such as residual sand may also be generally attached to the surfaces of the inner cavities of the castings, and then, the castings are generally required to be cleaned after being processed and produced so that the phenomenon that the quality of the castings is affected by pollutants such as residual sand and the oil stains is avoided. For high-pressure die-casting products such as a transmission, a torque converter and an engine shell, one workpiece is taken and placed by an operating worker at one time in cleaning and feeding processes in a conventional cleaning process, a flushing cycle is started after the workpiece is placed into cleaning equipment, the workpiece is taken out after being flushed, and thus, a working cycle is finished; and then, a new workpiece is placed, and the next cycle is started. In this way, one workpiece is flushed every time, continuous workpiece feeding is needed, and therefore, the labor intensity is high; in addition, the workpiece feeding time is directly prolonged, so that the cleaning efficiency is low, and the work efficiency is affected.

SUMMARY

The embodiment of the application provides a double-station cleaning system by which the problems of high labor intensity, low cleaning efficiency and work efficiency affected caused by continuous workpiece feeding due to the fact that the flushing equipment in the prior art is capable of flushing one workpiece every time are solved.

In order to achieve the aim, the present disclosure provides the following technical solution:

A double-station cleaning system is provided, comprising a cleaning machine, feeding frames, a guide rail assembly and a bracket assembly, wherein the feeding frames are used for containing to-be-cleaned workpieces; the cleaning machine is a drum-type cleaning machine, linear guide rails are arranged inside the cleaning machine, and the feeding frames are capable of walking on the linear guide rails; the guide rail assembly comprises two full-length guide rails which are fixedly arranged on the side of the lower end of a feeding inlet of the cleaning machine in an up-down parallel way; the bracket assembly comprises left and right trays, double-station connecting pieces, two tray frames, transverse plate supporting pieces, walking wheel group bases and walking wheels, the two tray frames are fixedly connected into a whole by the double-station connecting pieces, the two trays are respectively and horizontally fixedly arranged on the two tray frames, the inner left side and the inner right side of each tray are each fixedly provided with a nylon wheel base, the arrangement directions of the nylon wheel bases are the same as the directions of the linear guide rails inside the cleaning machine, each nylon wheel base is fixedly provided with a plurality of nylon wheels in a row; each tray frame is fixedly provided with an upper transverse plate supporting piece and a lower transverse plate supporting piece at positions corresponding to the two full-length guide rails, each transverse plate supporting piece is fixedly provided with a plurality of walking wheel group bases, the walking wheels are fixedly arranged on the walking wheel group bases, and the walking wheels on the upper and lower transverse plate supporting pieces are capable of sliding along the full-length guide rails; and the workpieces are placed into the feeding frames, the feeding frames are placed into the trays, the bracket assembly is pushed to drive the trays to move along the guide rail assembly, the feeding frame in one of the trays is conveyed to the feeding inlet of the cleaning machine, the feeding frame is pushed to move along two rows of nylon wheels and the linear guide rails inside the cleaning machine, and the feeding frame and the workpieces in the feeding frame are pushed into the cleaning machine so as to be cleaned.

In some embodiments, wherein each of the tray frames is provided with a horizontal surface, a vertical surface and an inclined supporting surface used for connecting the horizontal surface with the vertical surface, the horizontal surfaces of the tray frames are fixedly provided with the trays, and the vertical surfaces of the tray frames are fixedly provided with the upper and lower transverse plate supporting pieces corresponding to the full-length guide rails.

In some embodiments, wherein each of the tray frames comprises square steel pieces I, inclined supports, a square steel piece II and square steel pieces III, the square steel piece I at the left side, the square steel piece III at the left side and the inclined support at the left side form a right triangular frame, and the square steel piece I at the right side, the square steel piece III at the right side and the inclined support at the right side form a right triangular frame, all of each square steel piece I and part of the corresponding square steel piece III are used as the two right-angled sides, the corresponding inclined support 311 is used as the hypotenuse, and the two right triangular frames at the left and right sides are fixed connected by the square steel piece II to form a frame shaped like a right-angled triangular prism.

In some embodiments, wherein the trays are rectangular trays, the feeding frames are rectangular feeding frames, the inside of the cleaning machine is provided with the two linear guide rails, each linear guide rail is fixedly provided with the plurality of nylon wheels, each feeding frame is placed on two rows of nylon wheels on the corresponding tray, and the distance between the two rows of nylon wheels is approximately equal to the distance between the two linear guide rails in the cleaning machine.

In some embodiments, wherein each transverse plate supporting piece is fixedly provided with two walking wheel group bases, each walking wheel group base is fixedly provided with one walking wheel, a total of eight walking wheels are arranged, and the sizes of the walking wheels and the selection of bearings in the wheels meet a bearing requirement.

In some embodiments, wherein the trays are fixedly provided with tray handles. Further more, the left side of the left tray is provided with two tray handles at intervals, and the right side of the right tray is provided with two tray handles at intervals. The height positions of tray handles conform to the design of ergonomics.

In some embodiments, wherein the left and right ends of the full-length guide rail at the upper end are provided with anticollision mechanisms symmetrically arranged relative to the center of the guide rail, the anticollision mechanisms comprise anticollision bases and shock absorption rubber pads fixedly arranged on the anticollision bases, the positions of the two shock absorption rubber pads are opposite, the anticollision mechanism at the left end faces the right end, and the anticollision mechanism at the right end faces the left end.

In some embodiments, wherein the left and right sides of the lower end, corresponding to the feeding inlet of the cleaning machine, of the full-length guide rail at the upper end are each provided with a spring mechanism, and the two spring mechanisms are symmetrically arranged relative to the center of the guide rail; the spring mechanisms comprise bolt bases, screw rods, cylindrical helical compression springs, flat rubber pads and permanent magnets, the bolt bases are fixedly arranged on the full-length guide rail, and through holes are formed in the bolt bases; the screw rods are parallel to the full-length guide rail, one ends of the screw rods are arranged in the through holes of the bolt bases, the other ends of the screw rods are fixedly connected with the permanent magnets, and the permanent magnets are fixedly provided with the flat rubber pads; the cylindrical helical compression springs sleeve the screw rods, one ends of the cylindrical helical compression springs are connected to the bolt bases, and the other ends of the cylindrical helical compression springs are connected to the permanent magnets; and the flat rubber pad of the spring mechanism at the left side faces the left side, and the flat rubber pad of the spring mechanism at the right side faces the right side.

In some embodiments, wherein the left side of the tray frame at the left side is fixedly provided with one magnet impacting block, the right side of the tray frame at the right side is fixedly provided with one magnet impacting block, the positions of the two magnet impacting blocks are adapted to the positions of the permanent magnets of the spring mechanisms, and therefore, the magnet impacting blocks may be attracted to the permanent magnets of the spring mechanisms.

Compared with the prior art, the double-station cleaning system has the beneficial effects that: the present disclosure provides a double-station cleaning system comprising a cleaning machine, feeding frames, a guide rail assembly and a bracket assembly, workpieces are placed into the feeding frames, the feeding frames are placed into trays, the bracket assembly is pushed to drive the trays to move along the guide rail assembly, the feeding frame in one of the trays is conveyed to a feeding inlet of the cleaning machine, the feeding frame is pushed to move along two rows of nylon wheels and linear guide rails inside the cleaning machine, and the feeding frame and the workpieces in the feeding frame are pushed into the cleaning machine so as to be cleaned. According to the double-station cleaning system, the workpieces in one frame may be cleaned at one time, double stations are designed, one of the stations is used for realizing feeding, the other station is used for realizing discharging, and the double stations work alternately, so that the work time is saved, and the work efficiency is increased; in addition, due to the organic combination of permanent magnets and spring mechanisms, the labor amount of an operator is reduced, and the labor intensity is relieved.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

Figure 1:
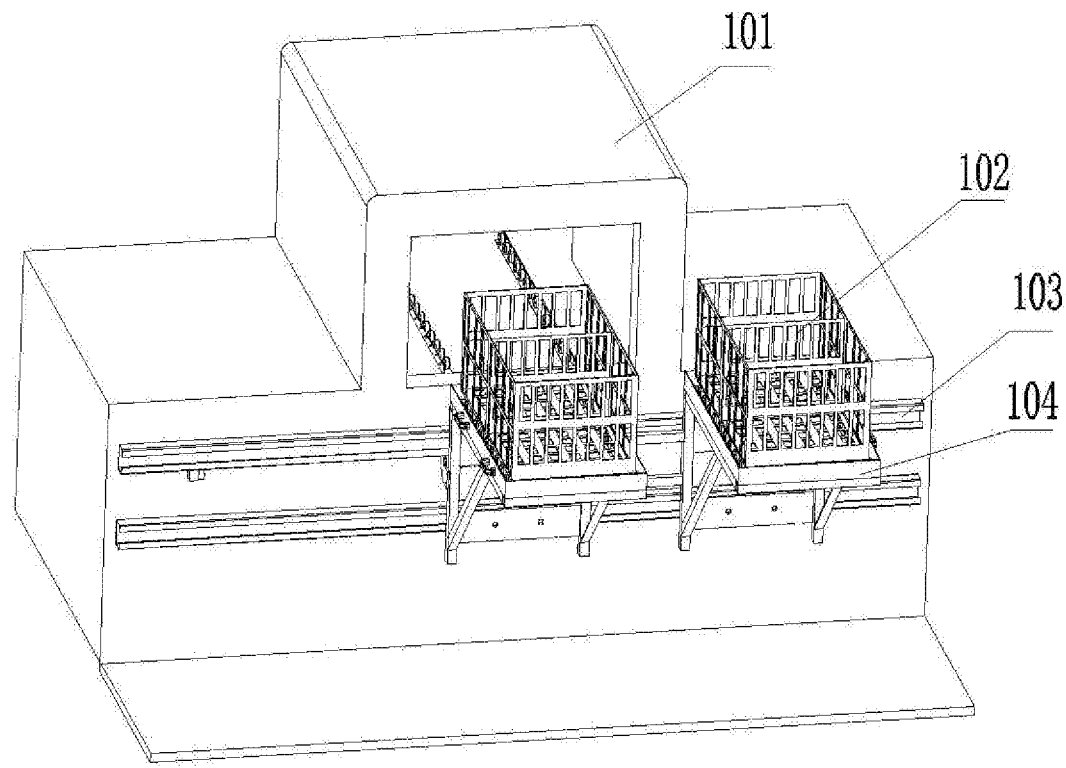
FIG. 1 is a composition schematic diagram of a double-station cleaning system provided by the application.
Figure 2:
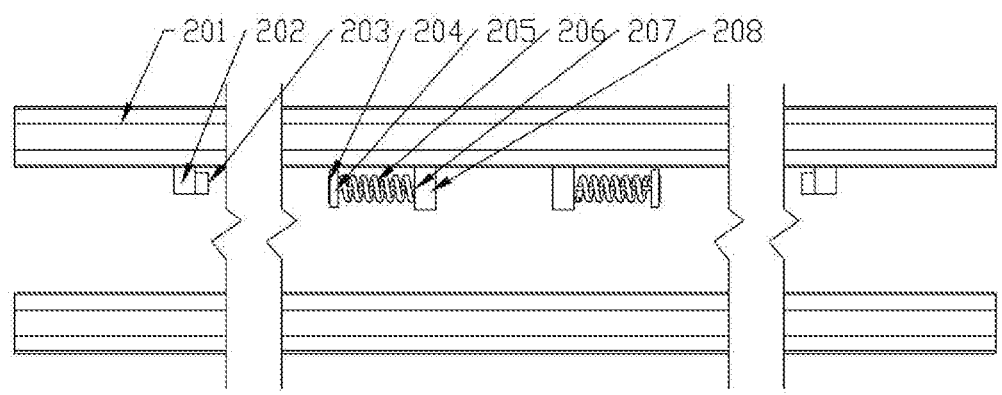
FIG. 2 is a schematic diagram of a guide rail assembly of the double-station cleaning system provided by the application.

wherein: 101—cleaning machine, 102—feeding frame, 103—guide rail assembly, 104—bracket assembly, 201—full-length guide rail, 202—anticollision base, 203—shock absorption rubber pad, 204—flat rubber pad, 205—permanent magnet, 206—cylindrical helical compression spring, 207—screw rod, 208—bolt base, 301—tray handle, 302—tray, 303—nylon wheel, 304—nylon wheel group base, 305—double-station connecting piece, 306—walking wheel, 307—walking wheel group base, 308—transverse plate supporting piece, 309—magnet impacting block, 310—square steel piece I, 311—inclined support, 312—square steel piece II, 313—square steel piece III, 401—feeding and discharging station I, 402—cleaning waiting station II, 403—cleaning machine working station, 404—feeding and discharging station III and 405—cleaning waiting station IV.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

The embodiment 1 of the application is described below in combination with accompanying drawings 1-4: a double-station cleaning system comprises a cleaning machine 101, feeding frames 102, a guide rail assembly 103 and a bracket assembly 104; the feeding frames 102 are rectangular feeding frames and are used for containing to-be-cleaned workpieces; the cleaning machine 101 is a drum-type cleaning machine, two linear guide rails are arranged inside the cleaning machine 101, each linear guide rail is fixedly provided with a plurality of nylon wheels 303, and the feeding frames 102 are capable of walking on the linear guide rails; the guide rail assembly 103 comprises two full-length guide rails 201, anticollision mechanisms and spring mechanisms, and the two full-length guide rails 201 are fixedly arranged on the side of the lower end of a feeding inlet of the cleaning machine in an up-down parallel way; and the left and right ends of the full-length guide rail 201 at the upper end are provided with the anticollision mechanisms symmetrically arranged relative to the center of the full-length guide rail 201, the anticollision mechanisms comprise anticollision bases 202 and shock absorption rubber pads 203 fixedly arranged on the anticollision bases 202, the positions of the two shock absorption rubber pads 203 are opposite, the anticollision mechanism at the left end faces the right end, and the anticollision mechanism at the right end faces the left end. The left and right sides of the lower end, corresponding to the feeding inlet of the cleaning machine 101, of the full-length guide rail 201 at the upper end are each provided with a spring mechanism, and the two spring mechanisms are symmetrically arranged relative to the center of the guide rail; the spring mechanisms comprise bolt bases 208, screw rods 207, cylindrical helical compression springs 206, flat rubber pads 204 and permanent magnets 205, the bolt bases 208 are welded on the full-length guide rail 201, and through holes are formed in the bolt bases 208; the screw rods 207 are parallel to the full-length guide rail 201, one ends of the screw rods 207 are arranged in the through holes of the bolt bases 208, the other ends of the screw rods 207 are fixedly connected with the permanent magnets 205, and the permanent magnets 205 are fixedly provided with the flat rubber pads 204; the cylindrical helical compression springs 206 sleeve the screw rods 207, one ends of the cylindrical helical compression springs 206 are connected to the bolt bases 208, and the other ends of the cylindrical helical compression springs 206 are connected to the permanent magnets 205; and the flat rubber pad 204 of the spring mechanism at the left side faces the left side, and the flat rubber pad 204 of the spring mechanism at the right side faces the right side.

Figure 3:
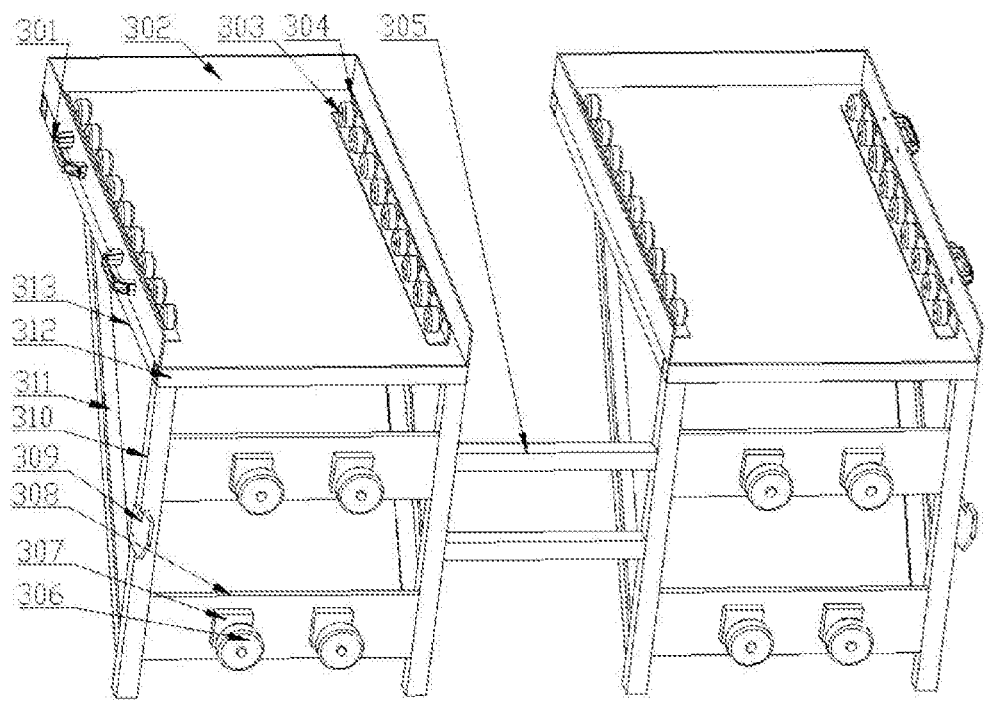
FIG. 3 is a schematic diagram of a bracket assembly of the double-station cleaning system provided by the application.

The bracket assembly comprises left and right trays 302, double-station connecting pieces 305, two tray frames, transverse plate supporting pieces 308, walking wheel group bases 307, walking wheels 306 and magnet impacting blocks 309, the whole bracket assembly is capable of walking on the guide rail assembly 103 in the left-right direction, each of the tray frames is provided with a horizontal surface, a vertical surface and an inclined supporting surface used for connecting the horizontal surface with the vertical surface; each of the tray frames comprises square steel pieces I 310, inclined supports 311, a square steel piece II 312 and square steel pieces III 313 and is welded as shown in FIG. 3, the square steel piece I 310 at the left side, the square steel piece III 313 at the left side and the inclined support at the left side form a right triangular frame, and the square steel piece I 310 at the right side, the square steel piece III 313 at the right side and the inclined support at the right side form a right triangular frame, all of each square steel piece I 310 and part of the corresponding square steel piece III 313 are used as the two right-angled sides, the corresponding inclined support 311 is used as the hypotenuse, and the two right triangular frames at the left and right sides are fixedly connected by the square steel piece II 312 to form a frame shaped like a right-angled triangular prism and are welded to form a rectangular structure, so that the bearing stability is guaranteed; the horizontal surfaces of the tray frames are fixedly provided with the trays 302 which are rectangular trays, the two tray frames are welded into a whole by the double-station connecting pieces 305, the two trays 302 are respectively and horizontally fixedly arranged on the two tray frames, the inner left side and the inner right side of each tray 302 are each fixedly provided with a nylon wheel base 304 in a welded way, the arrangement directions of the nylon wheel bases 304 are the same as the directions of the linear guide rails inside the cleaning machine 101, each nylon wheel base 304 is fixedly provided with a plurality of nylon wheels 303 in a row, each feeding frame 102 is placed on two rows of nylon wheels 303 on the corresponding tray 302, and the distance between the two rows of nylon wheels 303 is approximately equal to the distance between the two linear guide rails in the cleaning machine 101; the trays 302 are fixedly provided with tray handles 301, the left side of the left tray 302 is provided with two tray handles 301 at intervals, and the right side of the right tray 302 is provided with two tray handles 301 at intervals. The vertical surfaces of the tray frames are each fixedly provided with an upper transverse plate supporting piece 308 and a lower transverse plate supporting piece 308 corresponding to the full-length guide rails, each tray frame is fixedly provided with an upper transverse plate supporting piece 308 and a lower transverse plate supporting piece 308 at positions corresponding to the two full-length guide rails 201, each transverse plate supporting piece 308 is fixedly provided with two walking wheel group bases 307, the walking wheels 306 are fixedly arranged on the walking wheel group bases 307, each walking wheel group base 307 is fixedly provided with one walking wheel 306, a total of eight walking wheels 306 are arranged, and the sizes of the walking wheels 306 and the selection of bearings in the wheels meet a bearing requirement, and the walking wheels on the upper and lower transverse plate supporting pieces 308 are capable of sliding along the full-length guide rails 201. Two sides of the two tray frames are welded with the two magnet impacting blocks 309 of which the positions and sizes are beneficial to attraction of the magnet impacting blocks to the permanent magnets 205, the left side of the tray frame at the left side is welded with one magnet impacting block 309, the right side of the tray frame at the right side is fixedly provided with one magnet impacting block 309, the positions of the two magnet impacting blocks 309 are adapted to the positions of the permanent magnets 205 of the spring mechanisms, and therefore, the magnet impacting blocks 309 may be attracted to the permanent magnets 205 of the spring mechanisms. The workpieces are placed into the feeding frames 102, the feeding frames 102 are placed into the trays 302, the bracket assembly 104 is pushed to drive the trays 302 to move along the guide rail assembly 103, the feeding frame 102 in one of the trays 302 is conveyed to the feeding inlet of the cleaning machine 101, the feeding frame 102 is pushed to move along two rows of nylon wheels 303 and the linear guide rails inside the cleaning machine 101, and the feeding frame 102 and the workpieces in the feeding frame 102 are pushed into the cleaning machine 101 so as to be cleaned.

Figure 4:
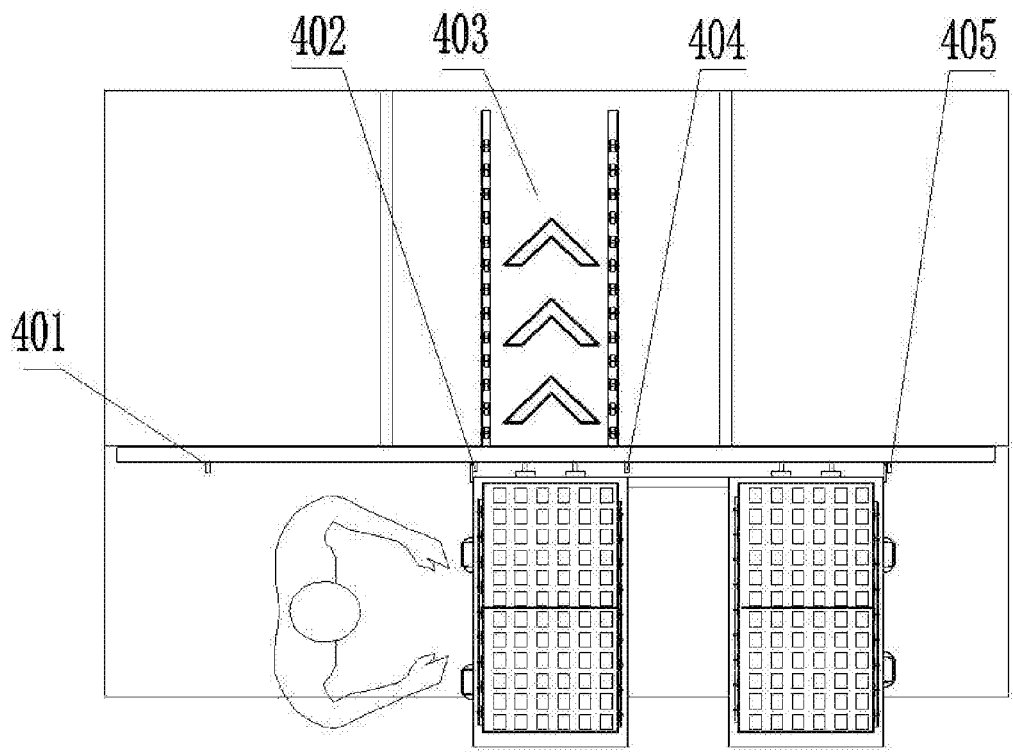
FIG. 4 is a schematic diagram of a double-station feeding device of the double-station cleaning system provided by the application.

The whole working process refers to FIG. 4, a worker puts four workpieces into the feeding frames 102 in a working process and pushes the handles to the right side until reaching a cleaning waiting station II 402, at the moment, the permanent magnets 205 and the magnet impacting blocks 309 are attracted together, namely one feeding frame reaches a feeding station, and the left-right shaking of the feeding frame is effectively avoided; and the worker pushes the feeding frame into a cleaning machine working station 403 for cleaning, and the feeding frame is pulled out after cleaning is ended. The worker stands on a position as shown in FIG. 4 and pushes the feeding frame rightwards to reach a cleaning waiting station IV 405, at the moment, the compression strokes of springs are indirectly limited by the shock absorption rubber pad 203 at the right side, the whole assembly accelerates to move leftwards if the worker loosens the grip at the moment, namely a pushing force is converted into a counter-acting force, the sum of the counter-acting force and the elastic force of the springs is larger than a magnetic force, at the moment, the whole feeding station moves leftwards to reach a feeding and discharging station III 404, the permanent magnets 205 and the magnet impacting blocks 309 are attracted together, at the moment, the feeding frame at the right side is pushed into the cleaning machine working station 403 to enter the next cycle, and the feeding frame is pulled out when cleaning is ended. The worker stands on an opposite position as shown in FIG. 4 and pushes the feeding frames leftwards to reach a feeding and discharging station I 401, at the moment, the compression strokes of the springs are indirectly limited by the shock absorption rubber pad 203 at the left side, the whole assembly accelerates to move rightwards if the worker loosens the grip at the moment, a pushing force is converted into a counter-acting force, the sum of the counter-acting force and the elastic force of the springs is larger than a magnetic force, at the moment, the whole feeding station moves rightwards to reach the cleaning waiting station II 402. The work of the next cycle is repeated as mentioned above.

For a conventional cleaning process of the high-pressure die-casting products such as the transmission, the torque converter and the engine shell, the workpieces are required to be taken from a transfer frame in the former process, the weight of each workpiece is about 23 kg, it takes 30 s to put two workpieces into equipment, in addition, the cleaning time is 180 s, and the cleaning process takes 180+30=210 s. After the double-station feeding frames are adopted, the workpieces are put into the feeding frames in the cleaning process, it takes 2 s to switch the double stations, it takes 2 s to push the feeding frames into the cleaning machine, namely the total time is 180+2+2=184 s, and 26 s is saved for each beat.

When a generator shell is cleaned, the workpieces are taken from the transfer frame, the weight of each workpiece is 1.3 kg, each cleaning feeding frame is capable of accommodating 20 shells, two workpieces are taken every time by the worker, it takes 4 s to take the workpieces every time, the total time consumption is 10*4=40 s, it takes 180 s to realize cleaning, it takes 180+40=220 s to realize the whole cycle, the time spent by the double-station system is still 2+2+ 180=184 s, and 36 s is saved for each beat.

It is clear that the present disclosure provides the double-station cleaning system comprising the cleaning machine, the feeding frames, the guide rail assembly and the bracket assembly, the workpieces are placed into the feeding frames, the feeding frames are placed into the trays, the bracket assembly is pushed to drive the trays to move along the guide rail assembly, the feeding frame in one of the trays is conveyed to the feeding inlet of the cleaning machine, the feeding frame is pushed to move along two rows of nylon wheels and the linear guide rails inside the cleaning machine, and the feeding frame and the workpieces in the feeding frame is pushed into the cleaning machine so as to be cleaned. According to the double-station cleaning system, the workpieces in one frame may be cleaned at one time, the double stations are designed, one of the stations is used for realizing feeding, the other station is used for realizing discharging, and the double stations work alternately, so that the work time is saved, and the work efficiency is increased; in addition, due to the organic combination of the permanent magnets and the spring mechanisms, the labor amount of an operator is reduced, and the labor intensity is relieved.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A double-station cleaning system, comprising:
a cleaning machine; feeding frames; a guide rail assembly; and a bracket assembly, wherein,
the feeding frames are used for containing to-be-cleaned workpieces; the cleaning machine is a drum-type cleaning machine, linear guide rails are arranged inside the cleaning machine, and the feeding frames are capable of walking on the linear guide rails; the guide rail assembly comprises two full-length guide rails which are fixedly arranged on the side of the lower end of a feeding inlet of the cleaning machine in an up-down parallel way;
the bracket assembly comprises left and right trays, double-station connecting pieces, two tray frames, transverse plate supporting pieces, walking wheel group bases and walking wheels, the two tray frames are fixedly connected into a whole by the double-station connecting pieces, the two trays are respectively and horizontally fixedly arranged on the two tray frames, the inner left side and the inner right side of each tray are each fixedly provided with a nylon wheel base, the arrangement directions of the nylon wheel bases are the same as the directions of the linear guide rails inside the cleaning machine, each nylon wheel base is fixedly provided with a plurality of nylon wheels in a row; each tray frame is fixedly provided with an upper transverse plate supporting piece and a lower transverse plate supporting piece at positions corresponding to the two full-length guide rails, each transverse plate supporting piece is fixedly provided with a plurality of walking wheel group bases, the walking wheels are fixedly arranged on the walking wheel group bases, and the walking wheels on the upper and lower transverse plate supporting pieces are capable of sliding along the full-length guide rails; and the workpieces are placed into the feeding frames, the feeding frames are placed into the trays, the bracket assembly is pushed to drive the trays to move along the guide rail assembly, the feeding frame in one of the trays is conveyed to the feeding inlet of the cleaning machine, the feeding frame is pushed to move along two rows of nylon wheels and the linear guide rails inside the cleaning machine, and the feeding frame and the workpieces in the feeding frame are pushed into the cleaning machine so as to be cleaned.

2. The double-station cleaning system of claim 1, wherein each of the tray frames is provided with a horizontal surface, a vertical surface and an inclined supporting surface used for connecting the horizontal surface with the vertical surface, the horizontal surfaces of the tray frames are fixedly provided with the trays, and the vertical surfaces of the tray frames are fixedly provided with the upper and lower transverse plate supporting pieces corresponding to the full-length guide rails.

3. The double-station cleaning system of claim 1, wherein each of the tray frames comprises square steel pieces I, inclined supports, a square steel piece II and square steel pieces III, the square steel piece I at the left side, the square steel piece III at the left side and the inclined support at the left side form a right triangular frame, and the square steel piece I at the right side, the square steel piece III at the right side and the inclined support at the right side form a right triangular frame, all of each square steel piece I and part of the corresponding square steel piece III are used as the two right-angled sides, the corresponding inclined support is used as the hypotenuse, and the two right triangular frames at the left and right sides are fixed connected by the square steel piece II to form a frame shaped like a right-angled triangular prism.

4. The double-station cleaning system of claim 1, wherein the trays are rectangular trays, the feeding frames are rectangular feeding frames, the inside of the cleaning machine is provided with the two linear guide rails, each linear guide rail is fixedly provided with the plurality of nylon wheels, each feeding frame is placed on two rows of nylon wheels on the corresponding tray, and the distance between the two rows of nylon wheels is approximately equal to the distance between the two linear guide rails in the cleaning machine.

5. The double-station cleaning system of claim 1, wherein each transverse plate supporting piece is fixedly provided with two walking wheel group bases, each walking wheel group base is fixedly provided with one walking wheel, a total of eight walking wheels are arranged, and the sizes of the walking wheels and the selection of bearings in the wheels meet a bearing requirement.

6. The double-station cleaning system of claim 1, wherein the trays are fixedly provided with tray handles.

7. The double-station cleaning system of claim 6, wherein the left side of the left tray is provided with two tray handles at intervals, and the right side of the right tray is provided with two tray handles at intervals.

8. The double-station cleaning system of claim 1, wherein the left and right ends of the full-length guide rail at the upper end are provided with anticollision mechanisms symmetrically arranged relative to the center of the guide rail, the anticollision mechanisms comprise anticollision bases and shock absorption rubber pads fixedly arranged on the anticollision bases, the positions of the two shock absorption rubber pads are opposite, the anticollision mechanism at the left end faces the right end, and the anticollision mechanism at the right end faces the left end.

9. The double-station cleaning system of claim 1, wherein the left and right sides of the lower end, corresponding to the feeding inlet of the cleaning machine, of the full-length guide rail at the upper end are each provided with a spring mechanism, and the two spring mechanisms are symmetrically arranged relative to the center of the guide rail; the spring mechanisms comprise bolt bases, screw rods, cylindrical helical compression springs, flat rubber pads and permanent magnets, the bolt bases are fixedly arranged on the full-length guide rail, and through holes are formed in the bolt bases; the screw rods are parallel to the full-length guide rail, one ends of the screw rods are arranged in the through holes of the bolt bases, the other ends of the screw rods are fixedly connected with the permanent magnets, and the permanent magnets are fixedly provided with the flat rubber pads; the cylindrical helical compression springs sleeve the screw rods, one ends of the cylindrical helical compression springs are connected to the bolt bases, and the other ends of the cylindrical helical compression springs are connected to the permanent magnets; and the flat rubber pad of the spring mechanism at the left side faces the left side, and the flat rubber pad of the spring mechanism at the right side faces the right side.

10. The double-station cleaning system of claim 9, wherein the left side of the tray frame at the left side is fixedly provided with one magnet impacting block, the right side of the tray frame at the right side is fixedly provided with one magnet impacting block, the positions of the two magnet impacting blocks are adapted to the positions of the permanent magnets of the spring mechanisms, and therefore, the magnet impacting blocks may be attracted to the permanent magnets of the spring mechanisms.

\* \* \* \* \*